United States Patent
Kim et al.

(10) Patent No.: US 12,056,528 B2
(45) Date of Patent: Aug. 6, 2024

(54) SYSTEM FOR COOPERATION OF DISAGGREGATED COMPUTING RESOURCES INTERCONNECTED THROUGH OPTICAL CIRCUIT, AND METHOD FOR COOPERATION OF DISAGGREGATED RESOURCES

(71) Applicant: ELECTRONICS AND TELECOMMUNICATIONS RESEARCH INSTITUTE, Daejeon (KR)

(72) Inventors: Daeub Kim, Daejeon (KR); Jongtae Song, Daejeon (KR); Ji Wook Youn, Daejeon (KR); Joon Ki Lee, Sejong-si (KR); Kyeong-Eun Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 757 days.

(21) Appl. No.: 17/221,086

(22) Filed: Apr. 2, 2021

(65) Prior Publication Data

US 2021/0334143 A1 Oct. 28, 2021

(30) Foreign Application Priority Data

Apr. 27, 2020 (KR) .................. 10-2020-0050595

(51) Int. Cl.
 *G06F 9/50* (2006.01)
(52) U.S. Cl.
 CPC .................. *G06F 9/5027* (2013.01)
(58) Field of Classification Search
 None
 See application file for complete search history.

(56) References Cited

U.S. PATENT DOCUMENTS 5,404,483 A * 4/1995 Stamm ............... G06F 12/0831
 711/143
7,634,650 B1 12/2009 Shah et al.
(Continued)

FOREIGN PATENT DOCUMENTS

KR 10-2007-0043536 A 4/2007
KR 10-2013-0129567 A 11/2013
(Continued)

OTHER PUBLICATIONS

Michael Gschwind; Optimizing Data Sharing and Address Translation for the Cell BE Heterogeneous Chip Multiprocessor; IBM T.J. Watson Research Center; IEEE 2008 (Gschwind_2008.pdf; pp. 478-485) (Year: 2008).*

(Continued)

*Primary Examiner* — Hiren P Patel
(74) *Attorney, Agent, or Firm* — LRK PATENT LAW FIRM

(57) ABSTRACT

A system for cooperation of disaggregated computing resources interconnected through an optical circuit, and a method for cooperation of disaggregated resources are disclosed. Functional block devices such as a processor block, an accelerator block, and a memory fabric block exist at a remote location, and these three types of remote functional block devices are interconnected and interoperated in a specific program to perform a cooperative computation and processing process. Accordingly, the system shares data and information of a memory existing in each block through optical signal interconnection that provides low-latency, fast processing, and wide bandwidth, and maintains cooperation and memory coherency.

12 Claims, 9 Drawing Sheets

(56) References Cited

U.S. PATENT DOCUMENTS

| | | | | |
|---|---|---|---|---|
| 8,996,812 | B2* | 3/2015 | Kornegay | G06F 12/0817 |
| | | | | 711/143 |
| 9,965,392 | B2* | 5/2018 | Asaro | G06F 12/0815 |
| 10,970,213 | B2* | 4/2021 | McGee | G06F 12/0815 |
| 11,921,635 | B2* | 3/2024 | Koker | G06F 12/0804 |
| 2003/0086300 | A1* | 5/2003 | Noyes | G06F 9/547 |
| | | | | 365/230.01 |
| 2006/0080513 | A1* | 4/2006 | Beukema | G06F 12/0828 |
| | | | | 711/146 |
| 2006/0259705 | A1* | 11/2006 | Cousin | G06F 12/0831 |
| | | | | 711/144 |
| 2009/0055596 | A1* | 2/2009 | Wallach | G06F 15/7867 |
| | | | | 712/30 |
| 2009/0198910 | A1* | 8/2009 | Arimilli | G06F 12/0831 |
| | | | | 711/E12.001 |
| 2010/0281231 | A1* | 11/2010 | Krishnan | G06F 13/161 |
| | | | | 711/E12.001 |
| 2011/0252200 | A1* | 10/2011 | Hendry | G06F 12/0831 |
| | | | | 711/147 |
| 2012/0317362 | A1* | 12/2012 | Hendry | G06F 12/0831 |
| | | | | 711/146 |
| 2013/0198755 | A1 | 8/2013 | Kim et al. | |
| 2013/0283286 | A1 | 10/2013 | Lee et al. | |
| 2014/0181417 | A1* | 6/2014 | Loh | H01L 25/18 |
| | | | | 711/141 |
| 2018/0285264 | A1* | 10/2018 | Kayiran | G06F 12/0806 |
| 2019/0196746 | A1* | 6/2019 | Fujimoto | G06F 13/12 |
| 2020/0050497 | A1* | 2/2020 | Kumar | H05K 7/1491 |
| 2020/0328879 | A1* | 10/2020 | Makaram | G06F 21/6209 |
| 2023/0169022 | A1* | 6/2023 | Jo | G06F 13/1668 |
| | | | | 711/154 |

FOREIGN PATENT DOCUMENTS

| | | |
|---|---|---|
| KR | 10-2016-0103085 A | 8/2016 |
| KR | 10-2017-0067716 A | 6/2017 |
| KR | 10-2019-0113040 A | 10/2019 |
| WO | 2019/165355 A1 | 8/2019 |

OTHER PUBLICATIONS

Suh et al.; "Supporting Cache Coherence in Heterogeneous Multi-processor Systems"; IEEE 2004; (Suh_2004.pdf; pp. 1-6) (Year: 2004).*

* cited by examiner

SYSTEM FOR COOPERATION OF DISAGGREGATED COMPUTING RESOURCES INTERCONNECTED THROUGH OPTICAL CIRCUIT, AND METHOD FOR COOPERATION OF DISAGGREGATED RESOURCES

CROSS-REFERENCE TO RELATED APPLICATION(S)

This application claims the benefit of Korean Patent Application No. 10-2020-0050595, filed on Apr. 27, 2020, in the Korean Intellectual Property Office, the disclosure of which is incorporated herein by reference.

BACKGROUND

1. Field of the Invention

Example embodiments relate to a system for cooperation of disaggregated computing resources interconnected through an optical circuit, and a method for cooperation of disaggregated resources, and more particularly, to a method and system for efficiently managing a use of data and a memory of a program that operates heterogeneous computing resources arranged in different remote locations used for computing for data processing and computation.

2. Description of Related Art

Recent data processing and data communication networks need to accommodate various services associated with artificial intelligence, autonomous driving, robots, healthcare, virtual/augmented reality, and home networks. To this end, the processing performance and efficiency of a cloud existing in a data center becomes important, and much data processing is operated in a data center-dependent manner. Accordingly, it is required to configure an edge, a core cloud, and a data center suitable for an increasing amount of data, and a more efficient computing structure and system than a server constituting a current cloud are required.

In a configuration of computing resources constituting an existing data center and cloud, conventional computing resources such as a processor, accelerator, memory, storage, and the like includes a single board or multiple boards, and are connected and operated by an electrical signal (bus) cable and a connector. In addition, among the computing resources, the storage is configured as a separate unit, and is configured and used in a structure capable of remote disaggregation and optical connection through a storage area network (SAN), a network attached storage (NAS) technology, and the like for storing massive data.

In comparison to an increase in an amount of data that needs to be processed by the cloud and data center, an electrical bus connection structure between the processor, accelerator, and memory degrades performance due to a bottleneck phenomenon caused by sequential data processing, increases the connection and processing speed of the processor and memory, and increases the number of cores of the processor. Accordingly, the performance of the entire system is not improved, and it is predicted that the improvement of a capacity and processing speed of an individual semiconductor will make it difficult to physically keep up with an increase rate of data to be processed.

As another disaggregation method, there is a technology in which respective computing resources are disaggregated in a single rack, departing from a server type configuration.

In this technology, the respective computing resources are disaggregated in the rack so that multiple processors and multiple accelerators simultaneously perform parallel processing for high-speed computing and processing of massive data such as artificial intelligence.

Here, there is a need for important technologies such as a homogeneous interworking technology between processors, a homogeneous interworking technology between accelerators, and a remote heterogeneous interworking technology between a processor-centric box including boards based on connections among the processors and an accelerator-centric box including boards based on connections among the accelerators.

In each processor-centric box and accelerator-centric box, a cache memory on chip and main memory on board are arranged, and the cache memory and main memory are used to calculate and process data of processors and accelerators in each box.

In addition, in order to share massive data using in memory, there is a memory fabric box including boards based on a connection between memories. The processor-centric box and the accelerator-centric box each have a basic memory, and there is a need for a remote interworking technology for sharing data in a memory with another box, and a remote interworking technology for sharing data in a memory among processor-centric boxes, the accelerator-centric boxes and the memory fabric boxes.

In an existing server-type box, a variable, processing and a calculated value of a program used for a processor and accelerator are stored in a memory during program operation, and a memory management system linked with an internal core of the processor has a hierarchical system for each level based on a cache. On-chip or on-board multiple processors, processor cores, and accelerators share a main memory, and maintain cache coherency.

However, when a memory connected by a bus and connector in a board exists in an external board, an external box, or an external rack for high-capacity and cooperation, and it is difficult to make a connect in the board using an electrical connection technology, an optical connection technology is used, and there is a need for a remote interworking and sharing technology including remote cache coherency, and a remote interworking and sharing technology including remote cache coherency of memory data stored in a large-capacity memory. These technologies are sensitive to time delay, and accordingly require fast processing with low-latency, and require a lot of bandwidth.

SUMMARY

Aspects provide a method and system for cooperation of disaggregated resources relating to remote disaggregation of heterogeneous computing resources for allowing the heterogeneous computing resources to overcome limitations on performance and a physical location of an individual chip and logically perform computing according to a program and service such as giant artificial intelligence, autonomous driving, virtual/augmented reality, and the like in a future data center.

Aspects provide a method and system for cooperation of disaggregated resources proposing a block structure applicable at a box scale and rack scale that allows multiple processors and accelerators to be operated simultaneously in parallel for processing a program and service accompanying high-speed data computation in a data center.

Aspects provide a method and system for cooperation of disaggregated resources relating to remote disaggregation of a large-capacity memory that allows a processor and accelerator to overcome limitations of performance and a physical location of an individual memory chip.

Aspects provide a method and system for cooperation of disaggregated resources, the method and system that, in a remote disaggregation environment of a memory, allow a processor and accelerator to share data for high-speed computation of the data, and share data and information of each memory so as to share data and information computed in a cooperative computing process, thereby maintaining cache coherency.

Aspects provide a method and system for cooperation of disaggregated resources, the method and system that allow a memory (a remote large-capacity memory fabric) to share data and information of each memory so as to share massive data and information computed in a cooperative computing process between a processor and an accelerator relating to data, thereby cache coherency.

According to an aspect, there is provided a method for cooperation of disaggregated resources performed by a system for cooperation of disaggregated resources, the method including setting a path between a plurality of blocks through a disaggregation switch so as to perform a cooperative operation of a memory among box-scale and rack-scale process blocks, accelerator blocks, and memory fabric blocks interconnected through an optical circuit, connecting the plurality of blocks according to the set path, and setting cooperative operation configuration information for allowing access to a memory included in each of the blocks to which the path is connected so as to perform the cooperative operation of the memory, and sharing, based on the cooperative operation configuration information, data of the memory included in each of the plurality of blocks according to a program that is sharable among the blocks to which the path is connected.

The sharing may include setting, based on the cooperative operation configuration information, one block of the blocks to which the path is connected to a master mode (or requester mode) that is an operation subject for controlling the memory and the data accessible inside and outside the block, setting, to a slave mode (or responder mode), a block other than the block set to the master mode (or requester mode), setting a program capable of sharing a memory through an optical circuit between the block set to the master mode (or requester mode) and the block set to the slave mode (or responder mode), and sharing the program and the memory set between the blocks to which the path is connected, and sharing information on the data included in each of the plurality of blocks in a cooperative computation process.

The processor blocks and the accelerator blocks may be configured to access a memory included in at least one block of the blocks to which the path is connected by using a remote memory agent included in each of the processor blocks and the accelerator blocks to control data of the accessed memory.

The remote memory agent may be configured to determine one block of the blocks to which the path is connected as a master mode (or requester mode) or a slave mode (or responder mode) with respect to each of the plurality of blocks in consideration of an operation subject for controlling a memory and data accessible inside and outside the block.

The remote memory agent may be configured to manage a virtual address and a physical address for accessing a memory included in each of the plurality of blocks, and manage coherency of data of a local memory and a remote memory.

The remote memory agent may be configured to distinguish coherent data and non-coherent data from each other by using the program and the data of the local memory and the remote memory.

The remote memory agent may be configured to transmit and receive the data of the memory included in each of the blocks to which the path is connected through the optical circuit.

The remote memory agent may be configured to manage a mapping table relating to a physical address, a virtual address, a remote physical address, and a disaggregation address existing in at least one of the process blocks, the accelerator blocks, and the memory fabric blocks, and convert an address value of the mapping table, when reconnecting a path between the plurality of blocks so as to perform the cooperative operation of the memory.

The memory fabric blocks may be configured to designate, so as to share the data of the memory included in each block according to a program that is sharable with the processor blocks or the accelerator blocks, a portion of the memory included in each of the blocks as a shared memory, and manage a shared memory of another block as a remote memory to share the remote memory with the processor blocks or the accelerator blocks.

According to another aspect, there is provided an apparatus for cooperation of disaggregated computing resources included in a processor block or an accelerator block, the apparatus including a coherency protocol agent configured to provide maintenance and management of coherency of data of a remote memory by applying the apparatus, a remote memory agent configured to control data of a memory included in each of blocks to which a path is connected so as to perform a cooperative operation of a memory among box-scale and rack-scale process blocks, accelerator blocks, and memory fabric blocks interconnected through an optical circuit, a local memory in which information and data used for processing and computation are stored, the local memory in the process blocks, the accelerator blocks, and the memory fabric blocks, a resource memory agent configured to control an arbitration function in consideration of an operation subject that reads and writes data between the remote memory agent and the local memory, a local memory controller configured to control data that is read and written between the remote memory agent and the local memory, a disaggregation interface configured to transmit and receive data for maintaining coherency of the local memory and the remote memory, and an information management interface configured to manage cooperative operation configuration information.

The coherency protocol agent may be configured to manage a virtual address and a physical address for accessing the local memory, manage a remote physical address and a disaggregation address by applying the apparatus, and provide maintenance and management of coherency of data of the local memory including a cache memory required for processing.

The resource memory agent may be configured to determine one block of the blocks to which the path is connected as a master mode (or requester mode) or a slave mode (or responder mode) with respect to each of the plurality of blocks in consideration of an operation subject for controlling a memory and data accessible inside and outside the block.

The resource memory agent may be configured to manage a virtual address and a physical address for accessing the local memory included in each of the plurality of blocks, and manage coherency of data of the local memory.

The remote memory agent may be configured to distinguish coherent data and non-coherent data from each other by using the program and the data of the local memory and the remote memory.

The resource memory agent may be configured to manage a mapping table relating to a physical address, a virtual address, a remote physical address, and a disaggregation address of at least one of the process blocks, the accelerator blocks, and the memory fabric blocks, and convert an address value of the mapping table, when reconnecting a path between the plurality of blocks so as to perform the cooperative operation of the memory.

The disaggregation interface may be configured to transmit and receive the data of the memory included in each of the blocks to which the path is connected through the optical circuit.

According to still another aspect, there is provided a resource memory agent included in an apparatus for cooperation of disaggregated computing resources, the resource memory agent including a memory management module configured to manage a local memory inside a block and a remote memory outside the block, a coherency management module configured to manage coherency of data of the local memory inside the block and the remote memory outside the block, a direct memory access module configured to provide a function of direct access to the local memory included in the block and the remote memory without involvement of a processor in the block, and a memory relationship management module configured to determine an access mode relating to the local memory and the remote memory as a master mode (or requester mode) or a slave mode (or responder mode) in consideration of an operation subject for controlling the data of the local memory inside the block and the remote memory outside the block.

The coherency management module may be configured to distinguish coherent data and non-coherent data by using the program and the data of the local memory and the remote memory to manage coherency of the data.

According to still another aspect, there is provided an apparatus for cooperation of disaggregated computing resources included in a memory fabric block, the apparatus including a memory disaggregation interface configured to transmit a disaggregation frame for maintaining coherency between a processor block and an accelerator block in connection with a remote memory included in the memory fabric block, a memory fabric agent configured to manage the remote memory in consideration of an operation subject according to a control request for performing a cooperative operation of a memory among the processor block or the accelerator block, and a memory fabric controller configured to control data of the memory transmitted and received by at least one block of the processor block or the accelerator block according to the control request.

Additional aspects of example embodiments will be set forth in part in the description which follows and, in part, will be apparent from the description, or may be learned by practice of the disclosure.

According to aspects, cooperation between blocks of disaggregated heterogeneous computer resources that are interconnected through an optical circuit may enable remote operation and cooperation of the blocks of the heterogeneous computer resources.

According to aspects, it is possible to avoid asymmetric exhaustion of heterogeneous computer resources between a processor block, an accelerator block, and a memory fabric block resulting from a rapid change in a program scale in consideration of scalability and flexibility of a data center relating to the heterogeneous computer resources, thereby integrally managing an operation load of the program in an efficient manner, and dynamically expanding an operation scale of the program.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
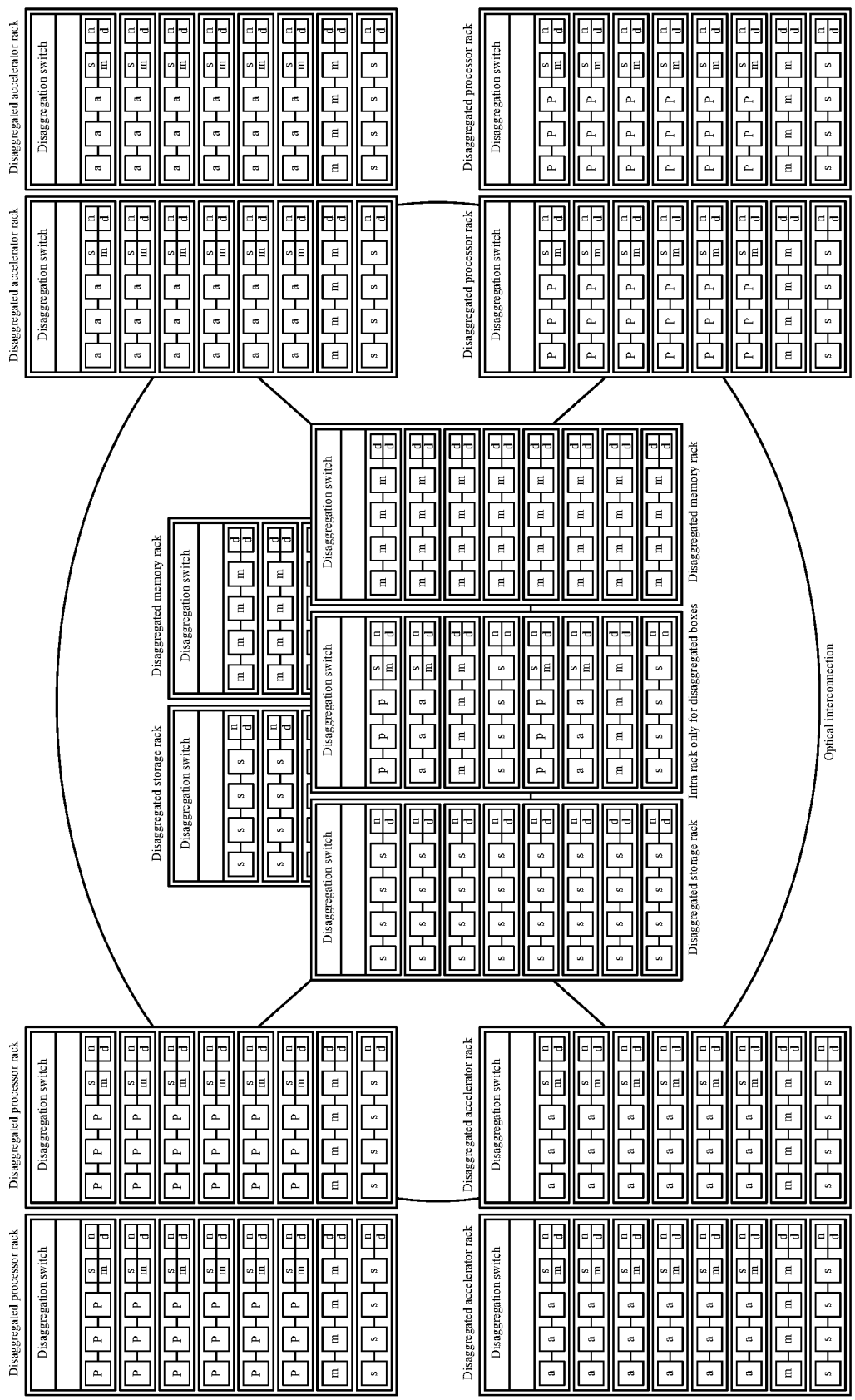
FIG. 1 is a diagram illustrating a configuration of racks of heterogeneous computing resources according to an optical signal-based interworking according to an example embodiment.

FIG. 1 is a diagram illustrating a configuration of racks of heterogeneous computing resources according to an optical signal-based interworking according to an example embodiment.

Referring to FIG. 1, a system for cooperation of disaggregated computing resources may perform rack-scale and box-scale disaggregation on heterogeneous computing resources in a future data center. The system may process massive data processed by the heterogeneous computing resources by applying the rack-scale disaggregation. In detail, the system may operate a large-scale program such as future supercomputing, large-scale artificial intelligence, or the like in the data center, and share data and information computed in a cooperative computing process. The system may be configured to have a block structure that is applicable at a box-scale or rack-scale respectively corresponding to the heterogeneous computing resources so as to increase activation and efficiency of the heterogeneous computing resources.

The system may have a box-scale or rack-scale block structure, and may include intra-rack disaggregated boxes in which a disaggregated processor box, a disaggregated accelerator box, a disaggregated storage box, and a disaggregated memory box that are arrangeable in different remote locations are connected by a disaggregation switch that is an optical circuit switch, or a disaggregated processor rack, a disaggregated accelerator rack, a disaggregated storage rack, a disaggregated memory rack, and the disaggregation switch that is the optical circuit switch.

The disaggregated processor rack may include a plurality of processor blocks. The disaggregated accelerator rack may include a plurality of accelerator blocks. The disaggregated storage rack may include a plurality of storage blocks. The disaggregated memory rack may include a plurality of memory fabric blocks. In a configuration of the intra-rack disaggregated boxes, each computing resource may be arranged in a rack configuration of a computing resource for high-speed computation and processing of massive data in one rack. In the configuration of the intra-rack disaggregated boxes, each computing resource block may be separately arranged in the rack configuration, and accordingly multiple processors and multiple accelerators may simultaneously perform parallel processing.

Thus, in the box-scale and rack-scale block structure, each box and each rack may be configured based on the same computing resource, and the system may perform arrangement of a rack in a data center and disaggregation between racks existing on each hierarchy in performing rack-scale disaggregation. The system may perform interconnection between a plurality of racks through an optical circuit. The system may require optical interconnection in which a transmission distance is easily changed to a broadband, and require a disaggregation interface based on the optical interconnection.

In addition, a capacity of a local memory where a processor and accelerator according to the structure simultaneously operate a program may be arranged at a smaller scale in comparison to resource scales of the processor and accelerator, unlike an existing server type, thereby increasing a memory sharing rate and efficiency using a disaggregation shape of a memory.

Figure 2:
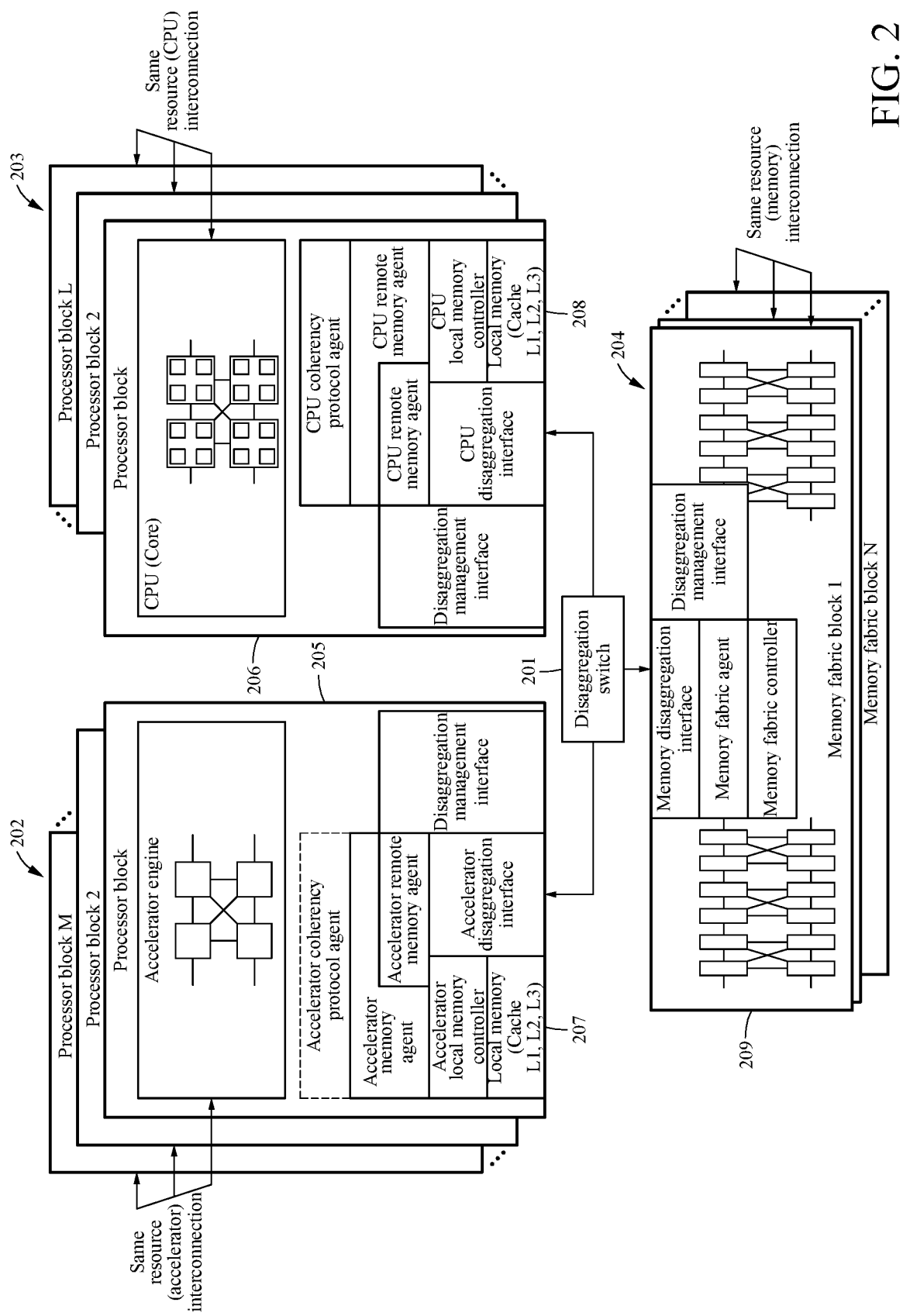
FIG. 2 is a diagram illustrating a functional block structure of heterogeneous computing resources according to an example embodiment.

FIG. 2 is a diagram illustrating a functional block structure of heterogeneous computing resources according to an example embodiment.

Referring to FIG. 2, the functional block structure may be applicable to heterogeneous computing resources of a data center. The functional block structure may be a structure that is be commonly applicable in a structure that is a rack-scale or box-scale disaggregation.

Here, the heterogeneous computing resources may be referred to by different names such as processor cores, CPUs, accelerators, memories as well as other types of FPGAs, DSPs, GPUs, and the like that are capable of participating in computing. Interworking between all computing resources using a memory in a data processing and computation process may be also applicable as the disclosure of the present patent application.

The processor block and accelerator block of the system may be remotely interconnected through an optical signal, and a program and a memory may be shared between the interconnected blocks. Here, processor blocks 203, accelerator blocks 202, and memory fabric blocks 204 may be configured to have a connection to a path between a plurality of blocks 202, 203, and 204 for performing disaggregation of a memory through a disaggregation switch that is an optical circuit switch.

The system may store data and information stored in each of a local memory 208 of the processor block 206 and a local memory 207 of the accelerator block 205 so as to share data and information of a program in a cooperative computation process. In addition, the system may perform optical connection disaggregation based on the heterogeneous computing resources so as to maintain coherency between the local memory 208 of the processor block 206 and the local memory 207 of the accelerator block 205.

The system may share a program and a memory stored in each of the local memories 207 and 208 of the blocks in a state in which the processor block 206 and the accelerator block 205 are remotely interconnected. The system may share the data and information of the program in linkage with a remote memory included in the memory fabric block 208. In case that the scale of data and information of a sharable program is large when sharing the data and information of the program in the cooperative computation process, the system may be linked with a remote memory included in the memory fabric block 209. In other words, the system may perform, in consideration of the data and information of the sharable program, hierarchical memory management with respect to the remote memory of the memory fabric block 209, and each local memory 207 or 208 included in the processor block 206 or the accelerator block 205. In addition, the system may perform heterogeneous computing resources-based optical connection disaggregation so as to maintain coherency between the remote memory of the memory fabric block 209, and each local memory 207 or 208 included in the processor block 206 or the accelerator block 205.

When using the local memory 208 of the processor block 206, the local memory 207 of the accelerator block 205 or the memory fabric block 209 as the remote memories, an operation system (OS) operating the heterogeneous computing resources may recognize a local memory of a processor block or an accelerator block existing at a remote location of each block and a memory fabric block as a new memory hierarchy.

In the disaggregation of the heterogeneous computing resources according to example embodiments, functional block devices such as the processor block 206, the accelerator block 205, and the memory fabric block 209 may exist at a remote location, and in a specific program, the blocks may be interconnected and interoperated according to the functional block structure of the program to perform the cooperative computation process. The processor blocks 203 and accelerator blocks 202 each may include a coherency protocol agent. In the accelerator block 202, the coherency protocol agent may exist depending on the situation. When there is no coherency protocol agent in the accelerator block 202, coherency of the accelerator block 205 may be also maintained by using the coherency protocol agent of the processor block 206. Here, the coherency protocol agent may manage a basic virtual address and physical address for accessing a local memory included in each of a plurality of blocks, manage a remote physical address and disaggregation address by applying an apparatus for cooperation of disaggregated computing resources, and provide coherency maintenance and management of data of a local memory including a cache memory required for processing. In addition, the coherency protocol agent may provide coherency maintenance and management of data of a remote memory by applying the apparatus.

In this case, according to example embodiments, it is possible to share data and information of a memory existing in each block and maintain coherency through interconnection that provides low-latency, fast processing, and wide bandwidth in the cooperative computation process.

A local memory controller of each of the processor block 206 and the accelerator block 205 may control memory reading and writing operations, when accessing a memory from a resource in each block of the processor block 206 and the accelerator block 205. In addition, the local memory controller of each of the processor block 206 and the accelerator block 205 may control reading and writing operations when accessing the memory so as to transmit and receive data stored in a local memory through a remote memory agent. Here, basic operations of each local memory controller and each local memory may be performed in the same manner as operations of controlling transmission/reception, reading, and writing of data performed by an existing server-type memory controller and memory.

Figure 3:
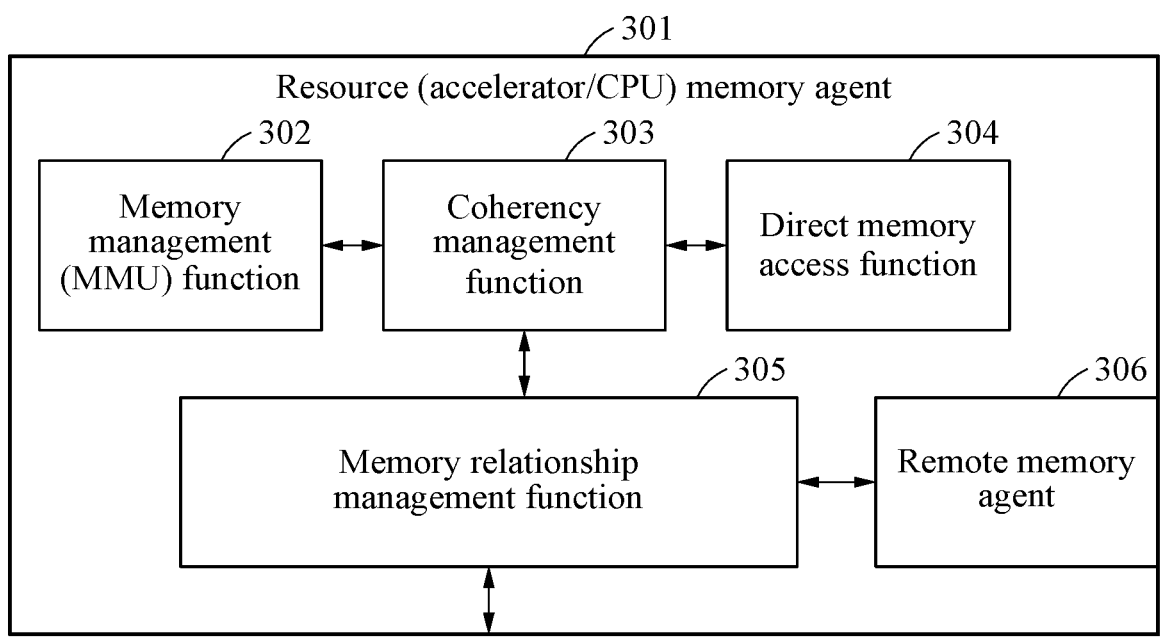
FIG. 3 is a diagram illustrating detailed functions of a resource memory agent included in each blocks of heterogeneous computing resources according to an example embodiment.

FIG. 3 is a diagram illustrating detailed functions of a resource memory agent included in each block of heterogeneous computing resources according to an example embodiment.

Referring to FIG. 3, a resource memory agent 301 may access a memory included in at least one block among blocks to which a path is connected to control data of the accessed memory.

In detail, the resource memory agent 301 may include a memory management module with memory management unit (MMU) function 302, a coherency management module with snoop and coherency function 303, a direct memory access (DMA) module 304, and a memory relationship management module 305. The resource memory agent 301 may have an individual function, and each of functions may be configured as a sub-block with respect to each of the modules.

The memory management module 302 may manage a local memory inside a block and a remote memory outside the block controlled by an apparatus for cooperation of disaggregated computing resources.

The coherency management module 303 may manage coherency of data of the local memory inside the block and the remote memory outside the block.

The direct memory access module 304 may provide a function of direct access to the local memory included in the block and the remote memory outside the block without involvement of a processor in the block.

The memory relationship management module 305 may consider an operation subject for controlling data of the local memory inside the block and the remote memory outside the block. The memory relationship management module 305 may determine an access mode relating to the local memory and the remote memory as a master mode (or requester mode) or a slave mode (or responder mode) to correspond to the operation subject.

A basic operation of the resource memory agent 301 included in a processor block and accelerator block may perform a function of the master mode (or requester mode) and the slave mode (or responder mode) to correspond to the operating subject of the processor block and accelerator block relating to a memory.

The memory relationship management module 305 may set, based on cooperative operation configuration information, one block of blocks to which a path is connected to a master mode (or requester mode) that is an operation subject for controlling a memory and data accessible inside and outside the block. The memory relationship management module 305 may set, to a slave mode (or responder mode), a block other than the block set to the master mode (or requester mode). The memory relationship management module 305 may set a program capable of sharing a memory through an optical circuit between the block set to the master mode (or requester mode) and the block set to the slave mode (or responder mode). The memory relationship management module 305 may share a program and memory prescribed between the blocks to which the path is connected, and share information on data included in each of a plurality of blocks in a cooperative computation process.

Accordingly, according to example embodiments, a processor and accelerator included in each of the processor block and accelerator block may control transmission/reception, reading, and writing of data between local memories through the resource memory agent 301.

In addition, the resource memory agent 301 of each of the processor block and accelerator block may perform an operation in a master mode (or requester mode) relating to a remote memory of another block. The resource memory agent 301 of each block may control transmission/reception, reading, and writing of data of the remote memory of another block through the remote memory agent 306.

Figure 4:
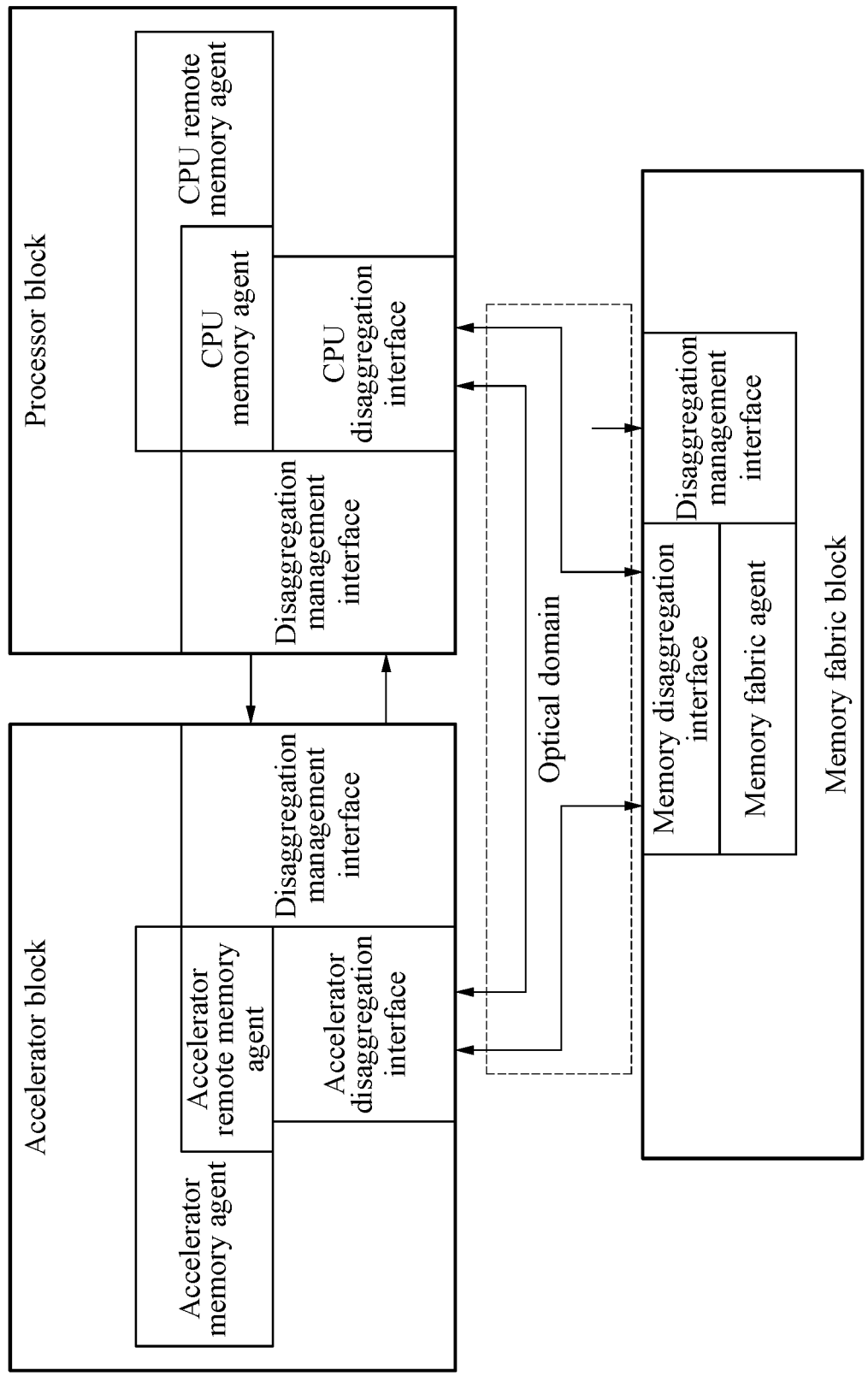
FIG. 4 is a diagram illustrating main functions of a system for cooperation of disaggregated computing resources to which an apparatus for cooperation of disaggregated computing resources is connected according to an example embodiment.

FIG. 4 is a diagram illustrating main functions of a system for cooperation of disaggregated computing resources to which an apparatus for cooperation of disaggregated computing resources is connected according to an example embodiment.

Referring to FIG. 4, the system may be interconnected through an optical signal for optical connection disaggregation of heterogeneous computing resources. The optical signal may provide wide bandwidth data with each of blocks with low-latency, fast processing over a distance where wide bandwidth data is not transmissible through an electrical signal. Accordingly, according to example embodiments, optical circuit networks may be formed by applying an optical circuit switch to an optical domain. A bi-directional optical circuit with sufficient bandwidth may be connected between respective blocks to prevent congestion in the optical domain.

The system may be basically operated based on cooperative configuration so as to apply a broadband optical circuit between blocks in performing disaggregation of heterogeneous computing resources. A disaggregation management interface (DMI) may transmit and receive cooperative operation configuration information associated with memory resource sharing to and from an OS or a control plane to set a resource memory agent and a disaggregation interface of each block. The cooperative operation configuration information may include a mapping table such as a physical memory address, an OS virtual memory address, each remote memory address, a disaggregation address used for a disaggregation frame, or the like.

Each disaggregation interface may perform physical hierarchy functions of an optical circuit such as an optical transceiver, a clock data recovery (CDR) function, a physical channel coding decoding function, and a Serdes function, which are essential for optical transmission. In addition, each disaggregation interface may perform a frame generation termination function suitable for transmission and reception of information on request and response messages associated with commands to read and write memory data, cache, and information required for maintaining coherency of a cache and a memory.

In memory disaggregation of each block, corresponding cooperative operation configuration information may designate whether a processor block, an accelerator block, and memory fabric blocks will play a role of a master mode (or requester mode) or a slave mode (or responder mode). In addition, the cooperative operation configuration information may set example embodiments and optical information such as a wavelength ID, a lane ID, a circuit ID, a destination block ID, and bandwidth for optical connection.

The remote memory agent may be a core module of a disaggregation apparatus, and the mounting of the remote memory agent may allow the OS of the disaggregation apparatus of heterogeneous computing resources to recognize that the disaggregation of the heterogeneous computing resources is applied through a drive and an OS kernel, and use and access a scalable remote memory. The remote memory agent may be liked to a memory management (MMU) function, coherency management function, direct memory access (DMA) function, and memory relationship management function in a block to enable each block to use and access a remote memory in the same manner as a local memory.

The remote memory agent may access the local memory, and read and write data without the involvement of a memory agent of a block (processor and accelerator) in each block. In this case, the remote memory agent may distinguish coherent data and non-coherent data from each other by using a program and data in the local memory and the remote memory.

The remote memory agent may transmit and receive data of a memory included in each of the blocks to which the path is connected through an optical circuit.

The remote memory agent may manage a mapping table with a physical memory address of a processor, an OS virtual memory address, each remote memory address, and a disaggregation address used for a disaggregation frame. The remote memory agent may perform a function of conversion between the addresses when accessing the remote memory.

The remote memory agent may configure the remote memory as a new memory hierarchy by extending an existing coherency maintenance function of each block so as to maintain coherency of remotely controllable data.

The remote memory agent may perform a master and slave function or requester and responder function of reading and writing remote memory data. The remote memory agent may be linked with or by-pass a resource memory agent in a block through the master and slave function. The remote memory agent may configure a data frame including reading and writing message information suitable for remote memory access to perform a request function and response function relating to reading and writing operations of memory data.

Figure 5:
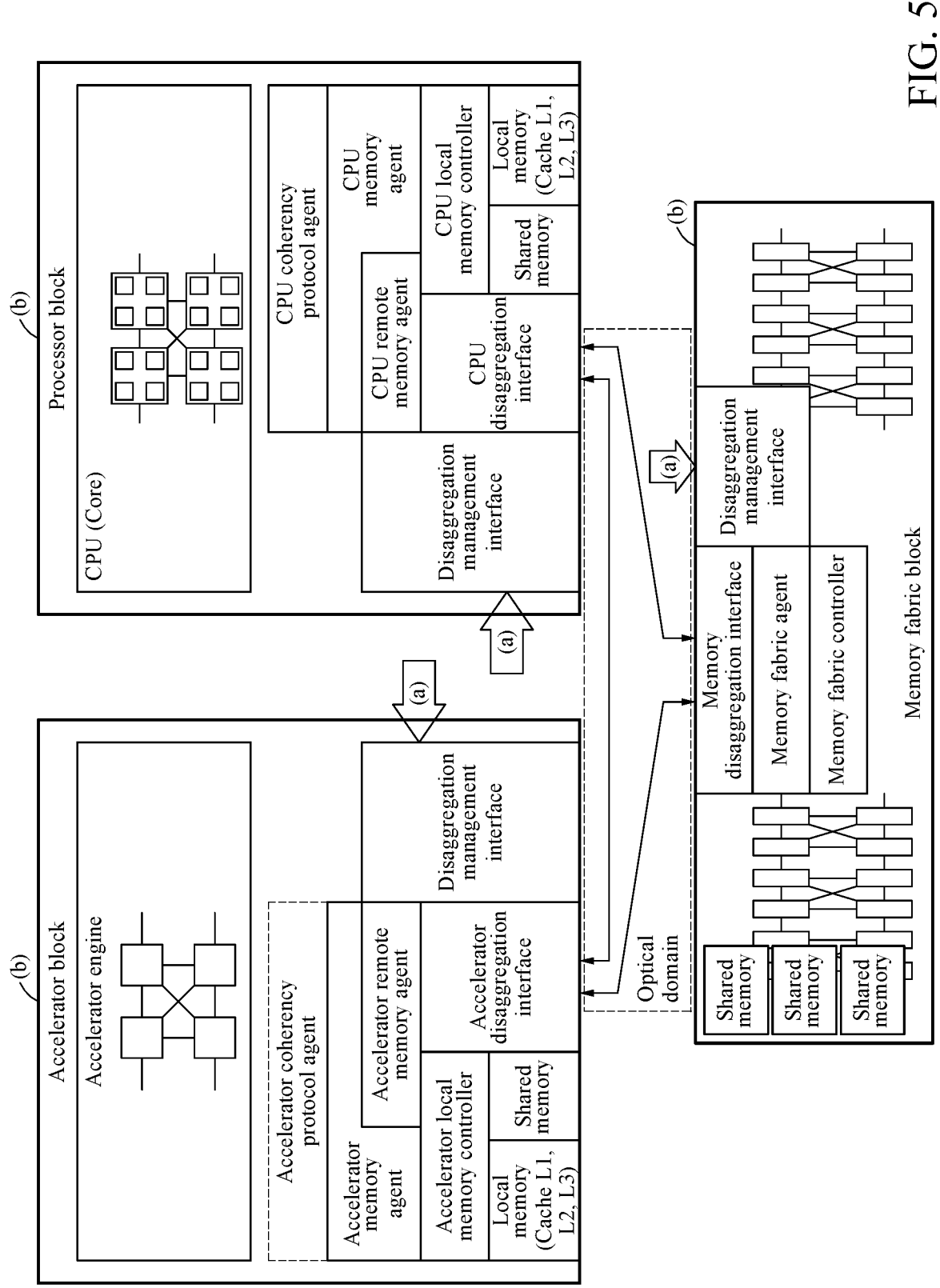
FIG. 5 is a diagram illustrating a memory included in each block of heterogeneous computing resources set as a shared memory and cooperative operation configuration information according to an example embodiment.

FIG. 5 is a diagram illustrating a memory included in each block of heterogeneous computing resources set as a shared memory and cooperative operation configuration information according to an example embodiment.

A disaggregation management interface corresponding to FIG. 5A may set an optical circuit and optical information (a wavelength ID, lane ID, circuit ID, destination block ID, bandwidth, and the like) for optical connection from an OS and a control plane so as to perform a cooperative operation of a memory among process blocks, accelerator blocks, and memory fabric blocks. The disaggregation management interface may set a remote memory ID used for each program, when a specific program that is sharable between blocks performs cooperation through a local memory and a remote memory of each block.

Through the disaggregation management interface, a mapping table with a physical memory address of a remote memory, an OS virtual memory address, each remote memory address, and a disaggregation address used for a disaggregation frame may be set and may be managed in each block in which a program is operated.

When setting of the optical circuit and optical information is completed through the disaggregation management interface, with respect to each block corresponding to FIG. 5B, a partial memory area of a local memory of a processor block and a local memory of an accelerator block may be set as a shared memory of each block according to example embodiments. In addition, each block may set a remote memory so as to access a shared memory of another block, and may designate a memory address and memory space to be used as the remote memory. The processor block and accelerator block may use a new memory hierarchy of a remote memory outside a block in a hierarchy system of a local memory thereof.

In addition, Parts of a memory fabric block may be designated a shared memory as the remote memories of the processor block and the accelerator block. When designating a memory address and memory space in which specific block IDs are to be used in the memory fabric block, the processor block and accelerator block may use a remote memory of the memory fabric block as a new memory hierarchy in the hierarchy system of the local memory thereof.

Figure 6:
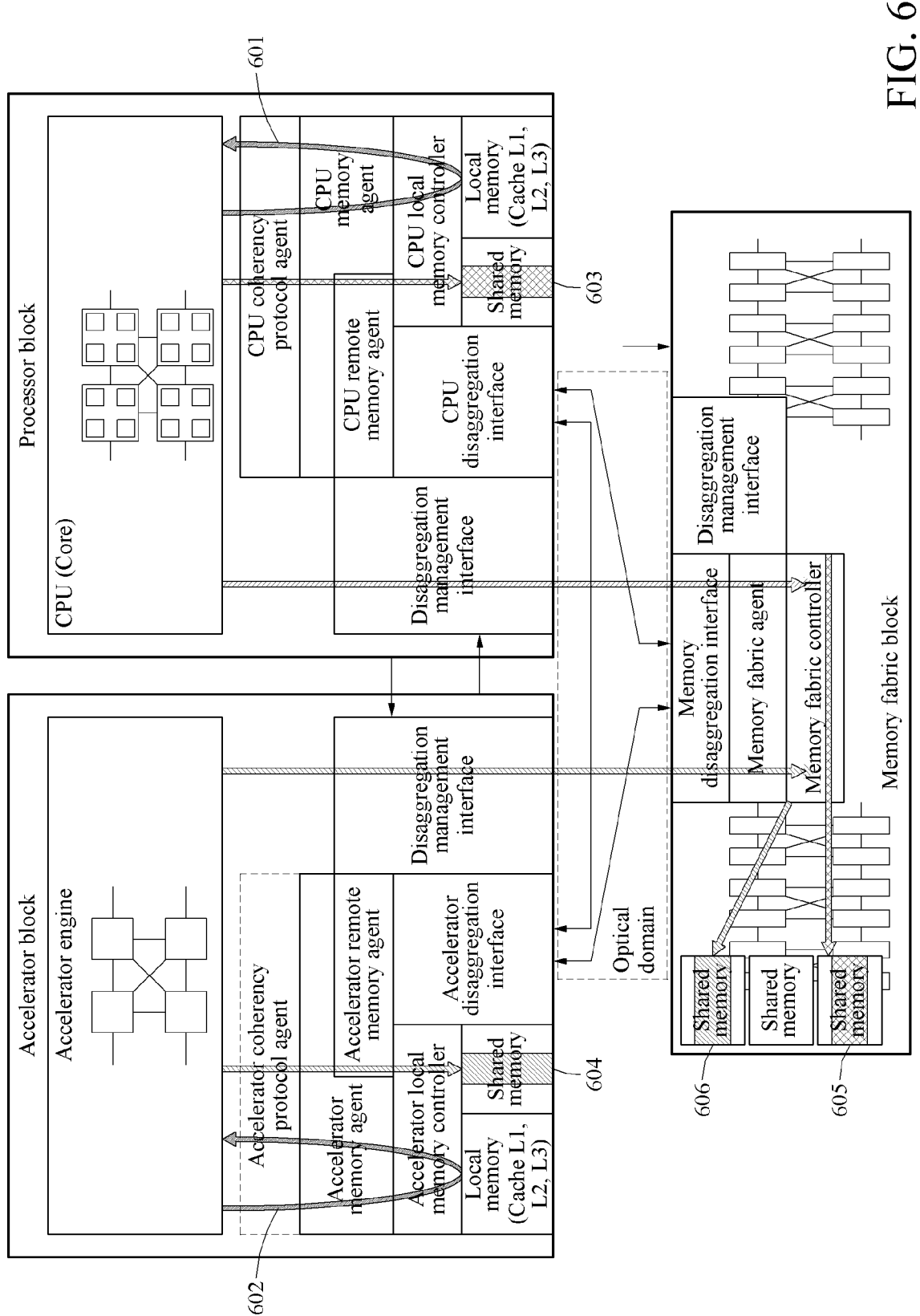
FIG. 6 is a diagram illustrating an operation of utilizing a memory included in each block of heterogeneous computing resources as a shared memory according to an example embodiment.

FIG. 6 is a diagram illustrating an operation of utilizing a memory included in each block of heterogeneous computing resources as a shared memory according to an example embodiment.

In operation 601, a core (processor) of a processor block may operate a program that is operated in a processor in a manner of storing data in a local memory of the processor block.

In operation 602, an accelerator engine of an accelerator block may operate a program that is operated in an accelerator of the accelerator block in a manner of storing data in a local memory of the accelerator block.

In operation 603, the core (processor) of the processor block may access a shared memory in a block, and an access delay relating to the shared memory in the processor block may be quickly operated at a level of the local memory. Setting of a remote memory in the block may have characteristics of having a less access delay and roundtrip delay than a memory fabric block when sharing a local memory with respective blocks of heterogeneous computing resources, and may be used when a relatively small scale of data sharing and fast processing are required. In a data processing process of the processor in the processor block, data for cooperation with the accelerator may be stored in the shared memory of the processor block so that the accelerator block performs an access.

In operation 604, the accelerator engine of the accelerator block may access a shared memory in the accelerator block, and the access delay relating to the shared memory in the processor block according to setting of the remote memory may be fast at a level of the local memory, and there may be characteristics of having a less access delay and roundtrip delay than the memory fabric block when sharing the memory with the heterogeneous computing resources. When a relatively small scale of data sharing and fast processing are required, the shared memories between the processor block and the accelerator block may be used. In a data processing process of the accelerator in the accelerator block, data for cooperation with the processor may be stored in the shared memory of the accelerator block so that the accelerator block performs an access.

In operations 605 and 606, the memory fabric block may be set as a shared memory for a cooperative program between the processor and the accelerator, and a remote memory. This may be used when it is relatively less sensitive to time delay and it is required to share relatively a large scale of data. In a data processing process of the processor and accelerator, data for cooperation may be stored in a shared memory of the memory fabric block so that the processor and accelerator perform an access.

Figure 7:
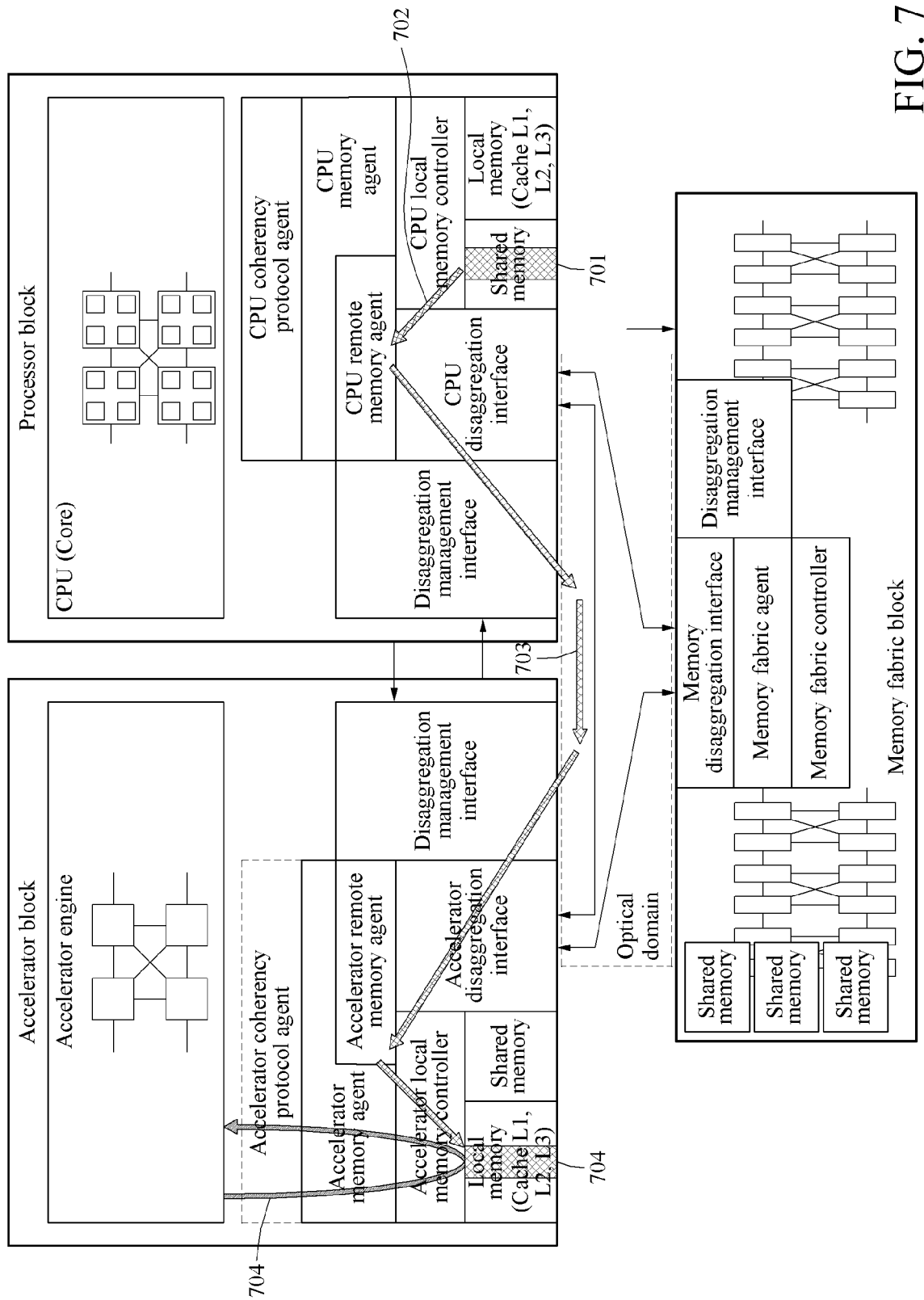
FIG. 7 is a diagram illustrating a process of maintaining coherency of a shared memory in a local memory of a processor block among heterogeneous computing resources according to an example embodiment.

FIG. 7 is a diagram illustrating a process of maintaining coherency of a shared memory in a local memory of a processor block among heterogeneous computing resources according to an example embodiment.

In operation 701, a processor block may store data (or processor cooperative data) for data cooperative processing with an accelerator in a process of processing data in the processor block in a shared memory of the processor block, or the data may be changed.

In operation 702, a remote memory agent (CPU remote memory agent) in a resource memory agent may detect a change or storage of new data of the shared memory in the processor block. The remote memory agent may read stored or changed processor cooperative data through a local memory controller (CPU local memory controller) in a shared memory space of a local memory in the processor block without involvement of a processor (or core).

The remote memory agent may transmit the processor cooperative data to a disaggregation interface (CPU disaggregation interface). In other words, when the remote memory agent needs to perform a data write command or write request on a local memory in an accelerator block, the read processor cooperative data from a local memory and information required for a disaggregation frame may be transmitted to the disaggregation interface. Here, the required information may be addresses such as a disaggregation address, a physical memory address, an OS virtual memory address, a remote memory address, and write command (request) information used for a disaggregation frame.

In operation 703, the disaggregation interface may generate a disaggregation frame capable of optical connection based on the disaggregation address and write command (request) information and the processor cooperative data received from the remote memory agent. The disaggregation interface may transmit the generated disaggregation frame to a disaggregation interface of the accelerator block.

The disaggregation interface of the accelerator block that has received the disaggregation frame may terminate the disaggregation frame, and may transmit the write command (request) and disaggregation address information and the processor cooperative data to a remote memory agent (Acc. remote memory agent) of the accelerator block.

In operation 704, the remote memory agent (Acc. remote memory agent) of the accelerator block may receive the disaggregation address and write command (request) information and the processor cooperative data. Thereafter, the remote memory agent of the accelerator block may store or change the processor cooperative data for cooperation in a local memory space of the accelerator block through a local memory controller of the accelerator block without involvement of the accelerator through the mapping table. The mapping table may include the physical memory address, OS virtual memory address, remote memory address, and disaggregation address used for the disaggregation frame.

In this case, the remote memory agent of the accelerator block may notify the resource memory agent that an operation of maintaining coherency of the processor cooperative data has been performed. In operation 704, when the resource memory agent recognizes that the processor cooperative data has been stored or changed in the space of the local memory of the accelerator block, the resource memory agent may perform an operation for maintaining coherency of the local memory. Thereafter, the resource memory agent may perform an operation of maintaining coherency by allowing the accelerator to use cooperative data updated in the local memory of the accelerator block in a data processing process so as to maintain the coherency. Thus, a system for cooperation of disaggregated heterogeneous computing resources may maintain coherency of cooperative data between the processor and the accelerator.

The resource memory agent may notify a coherency protocol agent of a coherency maintenance content recognized from the remote memory agent to allow the coherency protocol agent to integrally manage coherency maintenance of the local memory and the remote memory.

Figure 8:
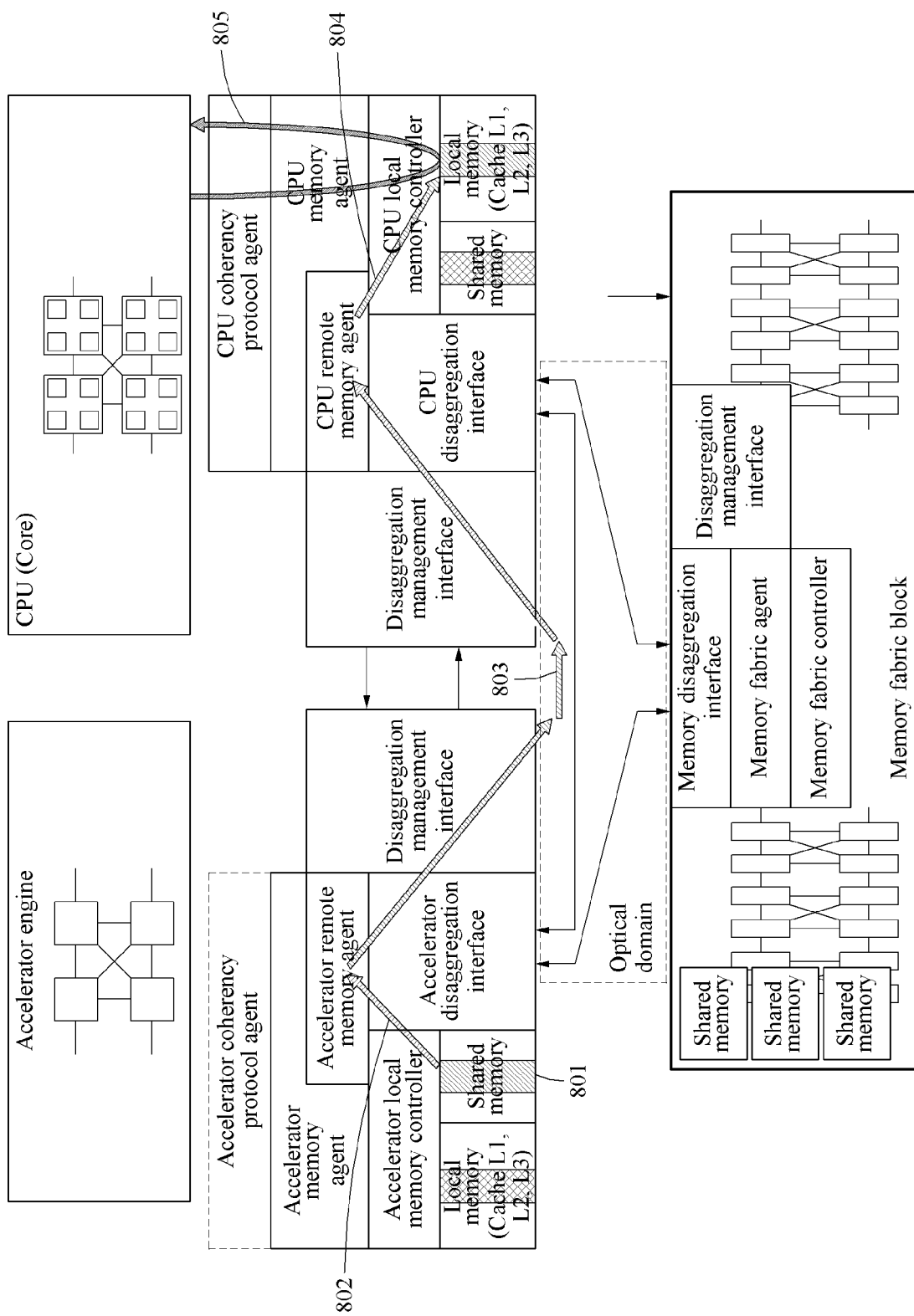
FIG. 8 is a diagram illustrating a process of maintaining coherency of a shared memory in a local memory of an accelerator block among heterogeneous computing resources according to an example embodiment.

FIG. 8 is a diagram illustrating a process of maintaining coherency of a shared memory in a local memory of an accelerator block among heterogeneous computing resources according to an example embodiment.

In operation 801, an accelerator block may store data (accelerator cooperative data) for data cooperative processing with a processor in a process of processing data in the accelerator block in a shared memory of the accelerator block, or the data may be changed.

In operation 802, a remote memory agent (ACC remote memory agent) in a resource memory agent may detect a change or storage of new data of the shared memory in the accelerator block. The remote memory agent may read stored or changed accelerator cooperative data through a local memory controller (ACC local memory controller) in a shared memory space of a local memory of the accelerator block without involvement of an accelerator.

The remote memory agent may transmit the accelerator cooperative data to a disaggregation interface (ACC disaggregation interface). In other words, when the remote memory agent needs to perform a write command or write request of the accelerator cooperative data on a local memory in a processor block, the read accelerator cooperative data from a local memory and information required for a disaggregation frame may be transmitted to the disaggregation interface. Here, the required information may be addresses such as a disaggregation address, a physical memory address, an OS virtual memory address, a remote memory address, and write command (request) information used for a disaggregation frame.

In operation 803, the disaggregation interface may generate a disaggregation frame capable of optical connection based on the disaggregation address and write command (request) information and the data received from the remote memory agent. The disaggregation interface may transmit the generated disaggregation frame to a disaggregation interface of the processor block.

The disaggregation interface of the processor block that has received the disaggregation frame may terminate the disaggregation frame, and may transmit the disaggregation address and write command (request) information and the accelerator cooperative data to a remote memory agent of the processor block.

In operation 804, the remote memory agent of the processor block may receive the disaggregation address and write command (request) information, and the accelerator cooperative data. The remote memory agent of the processor block may store or change the accelerator cooperative data in a memory space of the processor block through a local memory controller without involvement of a CPU through the mapping table. The mapping table may include the physical memory address, OS virtual memory address, remote memory address, and disaggregation address used for the disaggregation frame.

In this case, the remote memory agent of the processor block may notify a resource memory agent that an operation of maintaining coherency of the accelerator cooperative data has been performed. In operation 805, when the resource memory agent recognizes that the accelerator cooperative data has been stored or changed in a space of a local memory of the processor block, the resource memory agent may perform an operation for maintaining coherency of the local memory. Thereafter, the resource memory agent may perform an operation of maintaining coherency by allowing the processor to use the accelerator cooperative data updated in the local memory of the processor block in a data processing process so as to maintain the coherency. Thus, a system for cooperation of disaggregated heterogeneous computing resources may maintain coherency of cooperative data between the processor and the accelerator.

The resource memory agent may notify a coherency protocol agent of a coherency maintenance content recognized from the remote memory agent to allow the coherency protocol agent to integrally manage coherency maintenance of the local memory and the remote memory.

Figure 9:
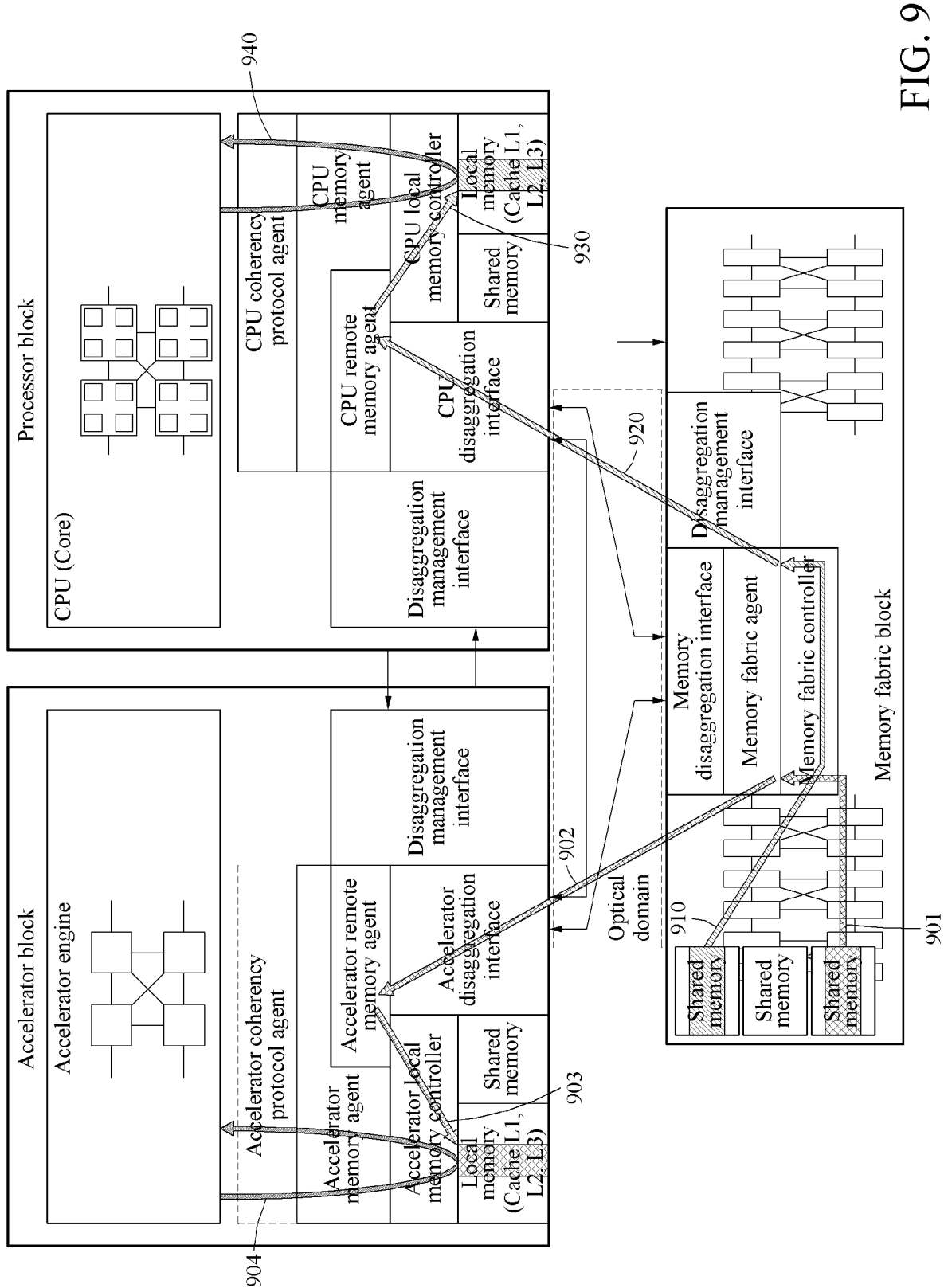
FIG. 9 is a diagram illustrating a process of maintaining coherency between data of a shared memory of a memory fabric block and data of a local memory of each block according to an example embodiment.

FIG. 9 is a diagram illustrating a process of maintaining coherency between data of a shared memory of a memory fabric block and data of a local memory of each block according to an example embodiment.

In operation 901, in a process of processing data of heterogeneous computing resources, as shown in (605), a processor already stored or changed processor cooperative data for cooperation with an accelerator in a shared memory of a memory fabric block. When the processor cooperative data is stored or changed in the shared memory of the memory fabric block, a memory fabric agent may detect a change or storage of the processor cooperative data of new data of the shared memory, and may read the stored or changed processor cooperative data through a memory fabric controller.

The memory fabric agent may transmit the processor cooperative data through a memory disaggregation interface. In other words, when the memory fabric agent needs to perform a data write command or write request on a local memory in an accelerator block, the memory fabric agent may transmit the read processor cooperative data and information required for a disaggregation frame to the memory disaggregation interface. Here, the required information may be addresses such as a disaggregation address, a physical memory address, an OS virtual memory address, a remote memory address, and write command (request) information used for a disaggregation frame.

In operation 902, the memory disaggregation interface may generate a disaggregation frame capable of optical connection based on the disaggregation address and write command (request) information and the data. The memory disaggregation interface may transmit the generated disaggregation frame to a disaggregation interface of the accelerator block.

The disaggregation interface of the accelerator block that has received the disaggregation frame may terminate the disaggregation frame, and may transmit the disaggregation address and write command (request) information and the processor cooperative data to a remote memory agent (Acc. remote memory agent) of the accelerator block.

In operation 903, the remote memory agent of the accelerator block may receive the disaggregation address and write command (request) information, and the processor cooperative data. Thereafter, the remote memory agent of the accelerator block may store or change the processor cooperative data for cooperation in a local memory space of the accelerator block through a local memory controller of the accelerator block without involvement of the accelerator through the mapping table.

In operation 904, the remote memory agent of the accelerator block may recognize that an operation of maintaining coherency of the processor cooperative data has been performed on the resource memory agent, and may perform an operation for maintaining coherency of the local memory. Thereafter, the resource memory agent may perform a data processing process by allowing the accelerator to use the processor cooperative data updated in the local memory of the accelerator block so as to maintain the coherency.

Accordingly, a system for cooperation of disaggregated heterogeneous computing resources may maintain coherency of cooperative data between the processor, the accelerator, and the memory fabric block.

In operation 910, in a process of processing the data of the heterogeneous computing resources, as shown in (606), the accelerator already stored or changed the accelerator cooperative data for cooperation with the processor in the shared memory of the memory fabric block. When the accelerator cooperative data is stored or changed in the shared memory of the memory fabric block, the memory fabric agent may detect a change or storage of the accelerator cooperative data of new data of the shared memory, and may read the stored or changed accelerator cooperative data through the memory fabric controller.

The memory fabric agent may transmit the accelerator cooperative data to the memory disaggregation interface. In other words, when the memory fabric agent needs to perform a data write command or write request on a local memory in a processor block, the memory fabric agent may transmit the read accelerator cooperative data and information required for a disaggregation frame to the memory disaggregation interface.

In operation 920, the memory disaggregation interface may generate a disaggregation frame capable of optical connection based on the disaggregation address and write command (request) information, and the data. The memory disaggregation interface may transmit the generated disaggregation frame to a disaggregation interface of the processor block.

The disaggregation interface of the processor block that has received the disaggregation frame may terminate the disaggregation frame, and may transmit the disaggregation address and write command (request) information and the accelerator cooperative data to a remote memory agent (Acc. remote memory agent) of the processor block.

In operation 930, the remote memory agent of the processor block may receive the disaggregation address and write command (request) information, and the accelerator cooperative data. The remote memory agent of the processor block may store or change the accelerator cooperative data in a memory space of the processor block through the local memory controller without involvement of a CPU through the mapping table.

In operation 940, the remote memory agent of the processor block may recognize that an operation of maintaining coherency of the accelerator cooperative data has been performed on the resource memory agent, and may perform an operation for maintaining coherency of the local memory. Thereafter, the resource memory agent may perform a data processing process by allowing the processor to use the accelerator cooperative data updated in the local memory of the processor block so as to maintain the coherency.

The resource memory agent may notify a coherency protocol agent of a coherency maintenance content recognized from the remote memory agent to allow the coherency protocol agent to integrally manage coherency maintenance of the local memory and the remote memory.

Accordingly, a system for cooperation of disaggregated heterogeneous computing resources may maintain coherency of cooperative data between the processor, the accelerator, and the memory fabric block.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, that is, a computer program tangibly embodied in an information carrier, for example, in a machine-readable storage device (for example, a computer-readable medium) or in a propagated signal for processing by, or to control an operation of a data processing apparatus, for example, a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. In general, a processor will receive instructions and data from a read-only memory or a random access memory or both. Elements of a computer may include at least one processor to execute instructions and one or more memory devices to store instructions and data. In general, a computer will also include or be coupled to receive data from, transfer data to, or perform both on one or more mass storage devices to store data, for example, magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), and the like, and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

In addition, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

It should be understood that example embodiments disclosed herein are merely illustrative and are not intended to limit the scope of the invention. It will be apparent to those skilled in the art that various modifications of the example embodiments may be made without departing from the spirit and scope of the claims and their equivalents.

What is claimed is:

1. A method of operating computing resources, the method comprising:
   snooping to detect whether data is stored or changed in a shared memory included in a first block of any one among processor blocks, accelerator blocks, and memory fabric blocks included in the computing resources;
   transmitting, when it is detected that data is stored or changed in the shared memory included in the first block, information for coherency maintenance in relation to the data to a second block of any one among remaining blocks, excluding the first block from the processor blocks, the accelerator blocks, and the memory fabric blocks; and performing a coherency maintenance operation on the data between the first block and the second block based on the information, wherein the transmitting comprises transmitting a request message for coherency maintenance to the second block, wherein the request message for coherency maintenance comprises at least one of request information and a disaggregation address through address mapping by a mapping table of cooperative operation configuration information related to the shared memory, the cooperative operation configuration information including a physical memory address, a virtual memory address, a remote memory address, or the disaggregation address used for a disaggregation frame.

2. The method of claim 1, further comprising:
transmitting a response message for coherency maintenance from the second block to the first block, when the coherency maintenance operation on the data between the first block and the second block is performed, wherein the response message for coherency maintenance comprises at least one of response information and a disaggregation address through address mapping by a mapping table of cooperative operation configuration information related to the shared memory, the cooperative operation configuration information including a physical memory address, a virtual memory address, a remote memory address, or the disaggregation address used for a disaggregation frame.

3. The method of claim 1, wherein the performing comprises storing or updating the data that is stored or changed in the shared memory included in the first block and the information for coherency maintenance in the second block.

4. The method of claim 1, wherein the processor blocks, the accelerator blocks, and the memory fabric blocks communicate through a switch.

5. The method of claim 1, wherein the information for coherency maintenance comprises at least one of information necessary for coherency maintenance of a memory and/or a cache for the data in the shared memory.

6. The method of claim 1, wherein when the first block is a memory fabric block, and a third block that shares the data in the shared memory with the second block is any one among remaining blocks, excluding the first block and the second block from the processor blocks, the accelerator blocks, and the memory fabric blocks, the transmitting comprises transmitting the information for coherency maintenance in relation to the data to the third block.

7. Computing resources comprising:
processor blocks comprising one or more processors;
accelerator blocks comprising one or more accelerators;
memory fabric blocks comprising one or more memories;
wherein when it is detected by one of the computing resources that data is stored or changed in a shared memory included in a first block of any one among the processor blocks, the accelerator blocks, and the memory fabric blocks included in the computing resources, the first block transmits information for coherency maintenance in relation to the data to a second block of any one among remaining blocks, excluding the first block from the processor blocks, the accelerator blocks, and the memory fabric blocks, and a coherency maintenance operation is performed on the data between the first block and the second block based on the information, wherein the first block transmits a request message for coherency maintenance to the second block, wherein the request message for coherency maintenance comprises at least one of request information and a disaggregation address through address mapping by a mapping table of cooperative operation configuration information related to the shared memory, the cooperative operation configuration information including a physical memory address, a virtual memory address, a remote memory address, or the disaggregation address used for a disaggregation frame.

8. The computing resources of claim 7, wherein the second block transmits a response message for coherency maintenance to the first block, when the coherency maintenance operation on the data between the first block and the second block is performed, wherein the response message for coherency maintenance comprises at least one of response information and a disaggregation address through address mapping by a mapping table of cooperative operation configuration information related to the shared memory, the cooperative operation configuration information including a physical memory address, a virtual memory address, a remote memory address, or the disaggregation address used for a disaggregation frame.

9. The computing resources of claim 7, wherein the second block stores the data that is stored or changed in the shared memory included in the first block and the information for coherency maintenance in the second block or updates the change in the second block.

10. The computing resources of claim 7, wherein the processor blocks, the accelerator blocks, and the memory fabric blocks communicate through a switch.

11. The computing resources of claim 7, wherein the information for coherency maintenance comprises at least one of information necessary for coherency maintenance of a memory and/or a cache for the data in the shared memory.

12. The computing resources of claim 7, wherein when the first block is a memory fabric block, and a third block that shares the data in the shared memory with the second block is any one among remaining blocks, excluding the first block and the second block from the processor blocks, the accelerator blocks, and the memory fabric blocks, the first block transmits the information for coherency maintenance in relation to the data to the third block.

* * * * *